United States Patent
Ljubuncic et al.

(10) Patent No.: US 10,257,269 B2
(45) Date of Patent: Apr. 9, 2019

(54) SELECTIVELY DISABLING OPERATION OF HARDWARE COMPONENTS BASED ON NETWORK CHANGES

(71) Applicant: Intel Corporation, Santa Clara, CA (US)

(72) Inventors: Igor Ljubuncic, London (GB); Raphael Sack, Mitzpe Amuka (IL); Tomer Rider, Naahryia (IL); Shahar Taite, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 212 days.

(21) Appl. No.: 14/747,639

(22) Filed: Jun. 23, 2015

(65) Prior Publication Data

US 2016/0381134 A1    Dec. 29, 2016

(51) Int. Cl.
| | |
|---|---|
| *G06F 21/70* | (2013.01) |
| *H04L 12/24* | (2006.01) |
| *H04L 12/26* | (2006.01) |
| *H04L 29/08* | (2006.01) |

(52) U.S. Cl.
CPC .......... *H04L 67/1061* (2013.01); *G06F 21/70* (2013.01); *H04L 43/16* (2013.01); *H04L 67/101* (2013.01); *H04L 41/0213* (2013.01); *H04L 41/12* (2013.01); *H04L 43/0852* (2013.01)

(58) Field of Classification Search
CPC ..... H04W 8/005; H04W 84/18; H04W 4/023; H04W 4/028; H04W 28/06; H04W 40/246; H04W 40/00; H04W 4/02; H04W 4/025; H04W 64/00; H04W 84/10; H04W 88/04; H04L 47/10; H04L 41/0896; H04L 12/1845; H04L 12/1868; H04L 12/189; H04L 41/0213; H04L 47/193; H04L 47/283; H04H 20/08
See application file for complete search history.

(56) References Cited

U.S. PATENT DOCUMENTS

| | | | | |
|---|---|---|---|---|
| 6,115,393 | A * | 9/2000 | Engel | H04L 41/0213 |
| | | | | 370/469 |
| 7,114,183 | B1 * | 9/2006 | Joiner | H04L 43/045 |
| | | | | 713/188 |
| 9,392,533 | B1 * | 7/2016 | Vivanco | H04W 48/16 |
| 9,819,572 | B2 * | 11/2017 | Singh | H04L 41/12 |
| 2004/0136379 | A1 * | 7/2004 | Liao | H04L 47/10 |
| | | | | 370/395.21 |
| 2005/0114397 | A1 * | 5/2005 | Doshi | H04L 41/00 |
| 2005/0240466 | A1 * | 10/2005 | Duggirala | G06Q 10/06315 |
| | | | | 705/7.25 |

(Continued)

*Primary Examiner* — Ninos Donabed
(74) *Attorney, Agent, or Firm* — Schwabe, Williamson & Wyatt, P.C.

(57) ABSTRACT

Disclosed herein are systems and methods for selectively disabling operation of hardware components based on network changes. In some embodiments, the hardware component may cause a platform to perform network discovery to receive first network discovery data, cause the platform to perform network discovery to receive second network discovery data, determine that the differences between the first and second data exceed a network change threshold, and in response to the determination, cause disablement of operation of one or more functions of the hardware component. Other embodiments may be disclosed and/or claimed.

25 Claims, 5 Drawing Sheets

(56) References Cited

U.S. PATENT DOCUMENTS

| | | | |
|---|---|---|---|
| 2006/0126514 A1* | 6/2006 | Lee | H04L 43/0811 370/238 |
| 2006/0135145 A1* | 6/2006 | Redi | H04W 52/0216 455/420 |
| 2006/0159095 A1* | 7/2006 | Cook | H04L 45/04 370/392 |
| 2006/0165040 A1* | 7/2006 | Rathod | G06Q 10/10 370/335 |
| 2006/0229083 A1* | 10/2006 | Redi | H04W 52/0216 455/453 |
| 2007/0013701 A1* | 1/2007 | Segawa | G06F 13/4022 345/502 |
| 2008/0267081 A1* | 10/2008 | Roeck | H04L 47/10 370/249 |
| 2011/0319064 A1* | 12/2011 | Lenart | H04W 52/0225 455/418 |
| 2013/0238771 A1* | 9/2013 | Kamble | H04L 41/0213 709/223 |
| 2013/0301504 A1* | 11/2013 | Lenart | H04W 52/0225 370/311 |
| 2015/0089259 A1* | 3/2015 | Warren | G06F 1/325 713/322 |
| 2016/0353298 A1* | 12/2016 | Vargantwar | H04W 72/0413 |

* cited by examiner

SELECTIVELY DISABLING OPERATION OF HARDWARE COMPONENTS BASED ON NETWORK CHANGES

TECHNICAL FIELD

The present disclosure relates generally to the field of computing hardware, and more particularly, to selectively disabling operation of hardware components.

BACKGROUND

In order to prevent theft in data centers, hardware components are conventionally locked or monitored, or access to these hardware components is limited to select personnel.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Disclosed herein are systems and methods for selectively disabling operation of hardware components based on network changes. For example, in some embodiments, a hardware component may be configured for selectively disabling operation of one or more functions of the hardware component based on changes in the network of hardware components around the hardware component. For example, in some embodiments, the hardware component may be configured to cause a platform of the hardware component to perform network discovery to receive first data representative of a first set of hardware components networked with the hardware component; cause storage of the first data; after storage of the first data, cause the platform of the hardware component to perform network discovery to receive second data representative of a second set of hardware components networked with a hardware component; determine that the differences between the first data and the second data exceed a network change threshold; and, in response to determining that the differences exceed the network change threshold, cause disablement of operation of one or more functions of the hardware component.

Various ones of the embodiments disclosed herein may provide a "safety in numbers" data center physical security model. Some such embodiments may provide a high level of security for hard disks and other hardware components (and the data therein) or maintaining ease of maintenance.

One of the most difficult challenges to data center security is the "inside man" attack. In such attacks, a person with authorized access to the data center may remove hardware components from the data center. Security measures that are put in place to prevent physical intrusion from outside are ineffective against such attacks.

The challenge of securing data center hardware is compounded by the deliberate design of data center hardware to be easily removable and portable (e.g., so that the hardware components can be plugged into different locations within the data center). Implementing physical locks impedes the removal and portability of the hardware components, degrading the ability of the data center administrator to run the data center effectively. In some data centers, the data stored in hardware components (e.g., hard disks) may be encrypted to secure the data against attackers, but encryption is not always possible or viable.

In some of the embodiments disclosed herein, a hardware component (e.g., a hard disk) may only work "properly" if the hardware component is in a familiar network environment. For example, a hardware component may include a firmware feature that, upon introduction into a data center environment, discovers the data center network using server platform broadcast techniques. The hardware component then may store the data to identify a "friendly" topology of neighboring devices, and begins operation. Any time the hardware component is powered on (e.g., after replacement between servers), the hardware component may check its environment; as long as the majority of the environment looks and behaves the same, the environment may still be considered "friendly" and the hardware component may still be operable. However, if the hardware component discovers that it is in an unfamiliar environment, it will not operate properly, and will instead be locked, blocked, or bricked until it is restored into the friendly environment or reset.

Various ones of the embodiments disclosed herein may operate only at the firmware/controller level and may use platform management to map the environment of a hardware component. These embodiments may be seamlessly used within a data center, allowing technicians to replace, move, and install new hardware without causing the disablement of hardware components as long as the "core" of the environment remains familiar.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the term "logic" may refer to, be part of, or include an Application Specific Integrated Circuit (ASIC), an electronic circuit, a processor (shared, dedicated, or group), and/or memory (shared, dedicated, or group) that executes one or more software or firmware programs, a combinational logic circuit, and/or other suitable components that provide the described functionality.

Figure 1:
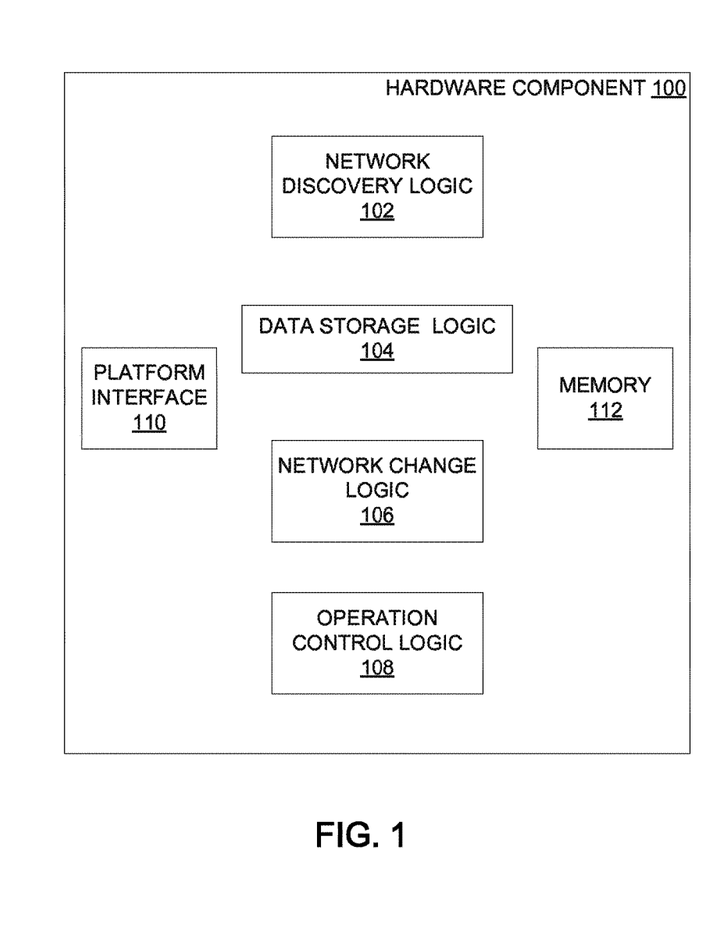
FIG. 1 is a block diagram of a hardware component incorporated with the selective disabling of operation technology of the present disclosure, in accordance with various embodiments.

FIG. 1 is a block diagram of a hardware component 100, incorporated with the selective disabling of operation technology of the present disclosure, in accordance with various embodiments. The hardware component 100 may be configured for selectively disabling operation of one or more functions of the hardware component based on changes in the network of hardware components around the hardware component 100. For example, in some embodiments, the hardware component 100 may be configured to cause a platform of the hardware component (e.g., the platform 200 discussed below with reference to FIG. 2) to perform network discovery to receive first data representative of a first set of hardware components networked with the hardware component 100; cause storage of the first data; after storage of the first data, cause the platform of the hardware component 100 to perform network discovery to receive second data representative of a second set of hardware components networked with a hardware component 100; determine that the differences between the first data and the second data exceed a network change threshold; and, in response to determining that the differences exceed the network change threshold, cause disablement of operation of one or more functions of the hardware component 100.

The hardware component 100 may be any hardware component found in a data center or other networked collection of computing hardware. For example, in some embodiments, the hardware component 100 may be a storage device, such as a solid state storage device, or a magnetic or optical hard disk. In some embodiments, the hardware component 100 may be a processing device, such as a server.

The hardware component 100 may include network discovery logic 102, data storage logic 104, network change logic 106, and operation control logic 108. Various operations and arrangements of these elements are discussed below. In some embodiments, the network discovery logic 102, data storage logic 104, network change logic 106, and the operation control logic 108 may be disposed within a common device housing (e.g., a plastic or metal shell). In some embodiments, the common device housing may include connectors to allow the hardware component 100 to be coupled to other components in a computer network (e.g., via a rack). In some embodiments, the network discovery logic 102, the data storage logic 104, the network change logic 106, and the operation control logic 108 may be included in firmware of the hardware component 100. In some such embodiments, the firmware may provide a secure environment that is resistant to tampering from the outside. For example, the firmware may include a Manageability Engine implementing the logic of the hardware component 100 discussed above.

The hardware component 100 may also include a platform interface 110 for exchanging data with the platform 200 of the hardware component 100, and a memory 112. In some embodiments, the platform interface 110 may be configured to provide a portion of a secure channel between the hardware component 100 and a remote administrator device (not shown) so that the hardware component 100 can receive commands from and provide information to the remote administrator device securely. The memory 112 may be coupled to one or more of the network discovery logic 102, the data storage logic 104, the network change logic 106, the operation control logic 108, and the platform interface 110 and may be configured with one or more data structures to store data processed or otherwise used during the operation of the hardware component 100. For example, the memory 112 may include a buffer to store data communicated to the hardware component 100 by the platform 200 via the platform interface 110. In another example, the memory 112 may include data structures to store data representative of hardware components networked with the hardware component 100 (e.g., the data structures 400 and 600 discussed below with reference to FIGS. 4 and 6, respectively). Although a single memory 112 is shown, the memory 112 may include multiple separate memory devices of different types or of a common type.

Figure 2:
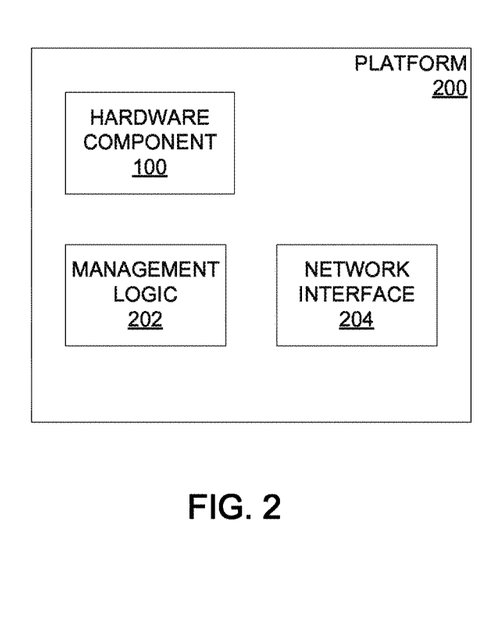
FIG. 2 is a block diagram of a platform including the hardware component of FIG. 1, in accordance with various embodiments.

The network discovery logic 102 may be coupled with the platform interface 110 and may be configured to cause the platform 200 to perform network discovery through network interface 204 to identify hardware components networked with the hardware component 100. The network discovery logic 102 may receive data from the platform 200 representative of a set of hardware components that were networked with the hardware component 100 at the time network discovery was performed. This data may provide a "snapshot" of the network environment of the hardware component 100, as seen by the platform 200. Various techniques for performing network discovery are discussed below with reference to the management logic 202 of the platform 200.

The network discovery logic 102 may cause the platform 200 to perform network discovery at multiple different times. In some embodiments, the network discovery logic 102 may cause the platform 200 to perform network discovery in accordance with a predetermined schedule (e.g., once per day). In some embodiments, the network discovery logic 102 may be configured to receive a signal from power control logic of the hardware component 100 (not shown) that indicates that the hardware component 100 has undergone a power-on event, and to cause the platform 200 to perform network discovery in response to receipt of the signal. Thus, in such embodiments, network discovery will be performed whenever a hardware component 100 is powered on (e.g., after being powered off). In some embodiments, the network discovery logic 102 may be configured to receive an initialization command from an administrator device via a secure channel to the hardware component 100 (e.g., via the platform interface 110 and the network interface 204 of the platform 200, discussed below with reference to FIG. 2). The network discovery logic 102 may be configured to cause the platform 200 to perform network discovery in response to receipt of the initialization command. Other operations of the hardware component 100 that may be performed in response to an initialization command are discussed below.

FIG. 2 is a block diagram of the platform 200 including the hardware component 100, in accordance with various embodiments. The platform 200 may also include management logic 202 and a network interface 204. The management logic 202 may be configured to perform network discovery operations (e.g., in response to a request from the network discovery logic 102 of the hardware component 100). Data transmitted to or from a computing network of the platform 200 may be communicated via the network interface 204. Network discovery may be performed in accordance with any conventional network discovery technique. For example, in some embodiments, the performance of network discovery by the management logic 202 may include the use of Simple Network Management Protocol (SNMP). In some embodiments, the management logic 202 may utilize local and remote shell protocols or network protocols such as Active Management Technology, vPro technology, out of band protocols, or any suitable technique.

Returning to FIG. 1, the data storage logic 104 may be coupled with the platform interface 110 and may be configured to cause storage of network discovery data returned by the platform 200 to the hardware component 100. This data may include data representative of a set of hardware components networked with the hardware component 100 at the time of network discovery. In some embodiments, this data may include identifiers of the hardware components in the set of hardware components. Any suitable identifiers may be used, such as Media Access Control (MAC) addresses, serial numbers (e.g., assigned to the hardware components by the manufacturer), Internet Protocol (IP) addresses, or any other identifier of a hardware component on a network. The data storage logic 104 may be configured to store such identifiers in the memory 112.

In some embodiments, the network discovery data may include data travel times between the platform 200 and one or more of the hardware components in the "discovered" set of hardware components. In some embodiments, data travel times may be measured using time units (e.g., milliseconds). In some embodiments, data travel time may be measured as a number of hops that data must make between devices. In some embodiments, a data travel time may be a round-trip data travel time, while in other embodiments, a data travel time may be a one-way data travel time. The data storage logic 104 may be configured to store such data travel times in the memory 112.

The data storage logic 104 may be configured to store different sets of network discovery data generated by the platform 200 at different times. For example, the platform 200 may perform a first round of network discovery in response to a first request from the network discovery logic 102, and the data storage logic 104 may store the network discovery data returned by the platform 200 as first network discovery data. The platform 200 may then perform a second round of network discovery in response to a second request from the network discovery logic 102, and the data storage logic 104 may store the network discovery data returned by the platform 200 a second network discovery data. The data storage logic 104 may store network discovery data in any suitable manner that permits different sets of network discovery data to be compared so that changes in the network environment of the hardware component 100 may be detected and evaluated (e.g., as discussed below with reference to the network change logic 106). Additionally, although a single "platform 200" may be referred to herein, the platform 200 may be different physical platforms over time if the hardware component 100 is removed from a first platform and coupled with a second different platform. In both cases, the hardware component 100 may communicate with its current platform, and that current platform is referred to herein as the platform 200. Thus, in some cases, a first set of network discovery data may be provided to the hardware component 100 from one platform, and a second set of network discovery data may be provided to the hardware component 100 from a different platform (e.g., when the hardware component 100 is moved between platforms between rounds of network discovery).

Figures 3, 4:
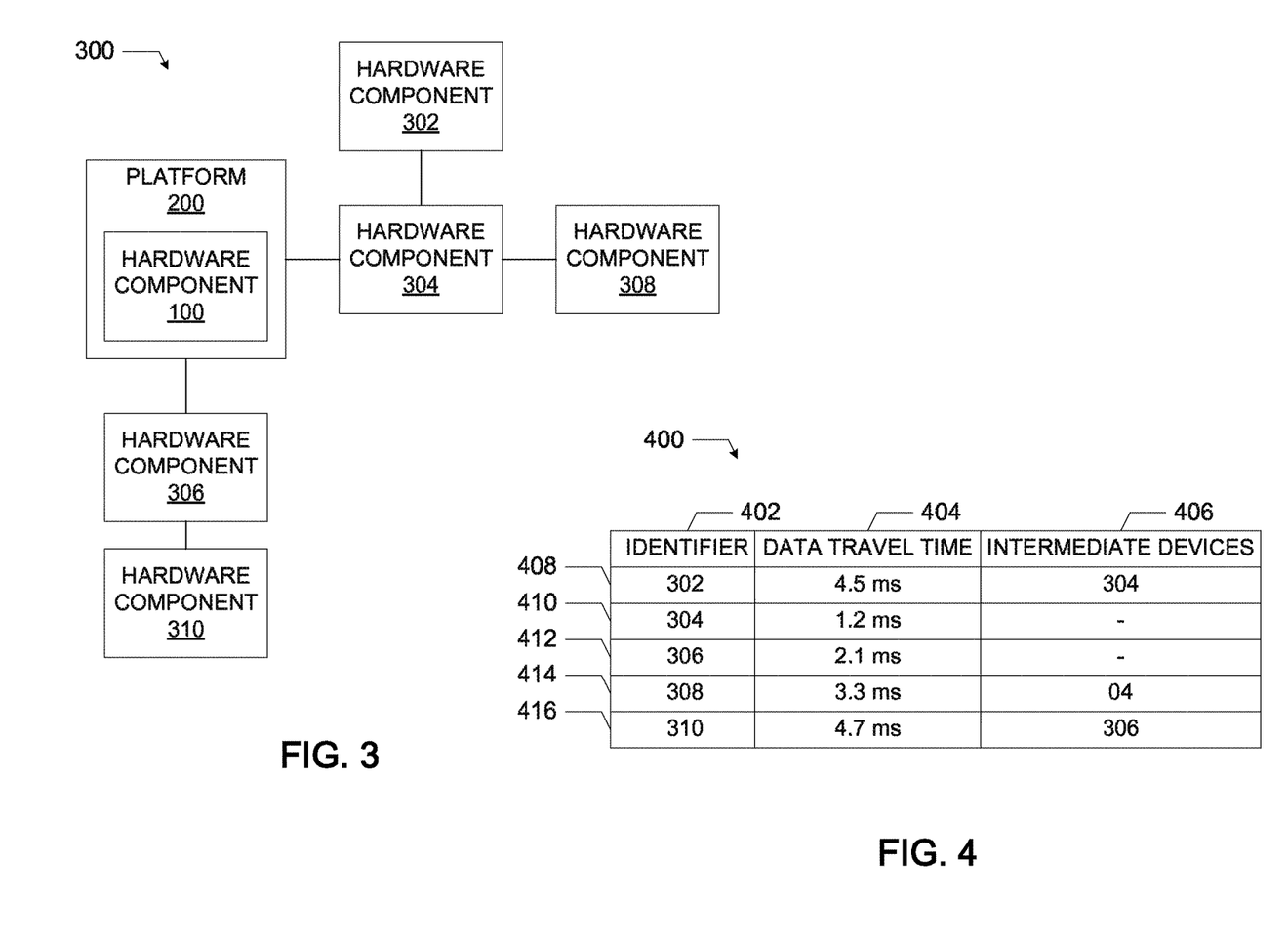
FIG. 3 illustrates a networked arrangement of hardware components, in accordance with various embodiments.
FIG. 4 is a data structure that may be used to store data representative of the hardware components in the networked arrangement of FIG. 3, in accordance with various embodiments.
Figures 5, 6:
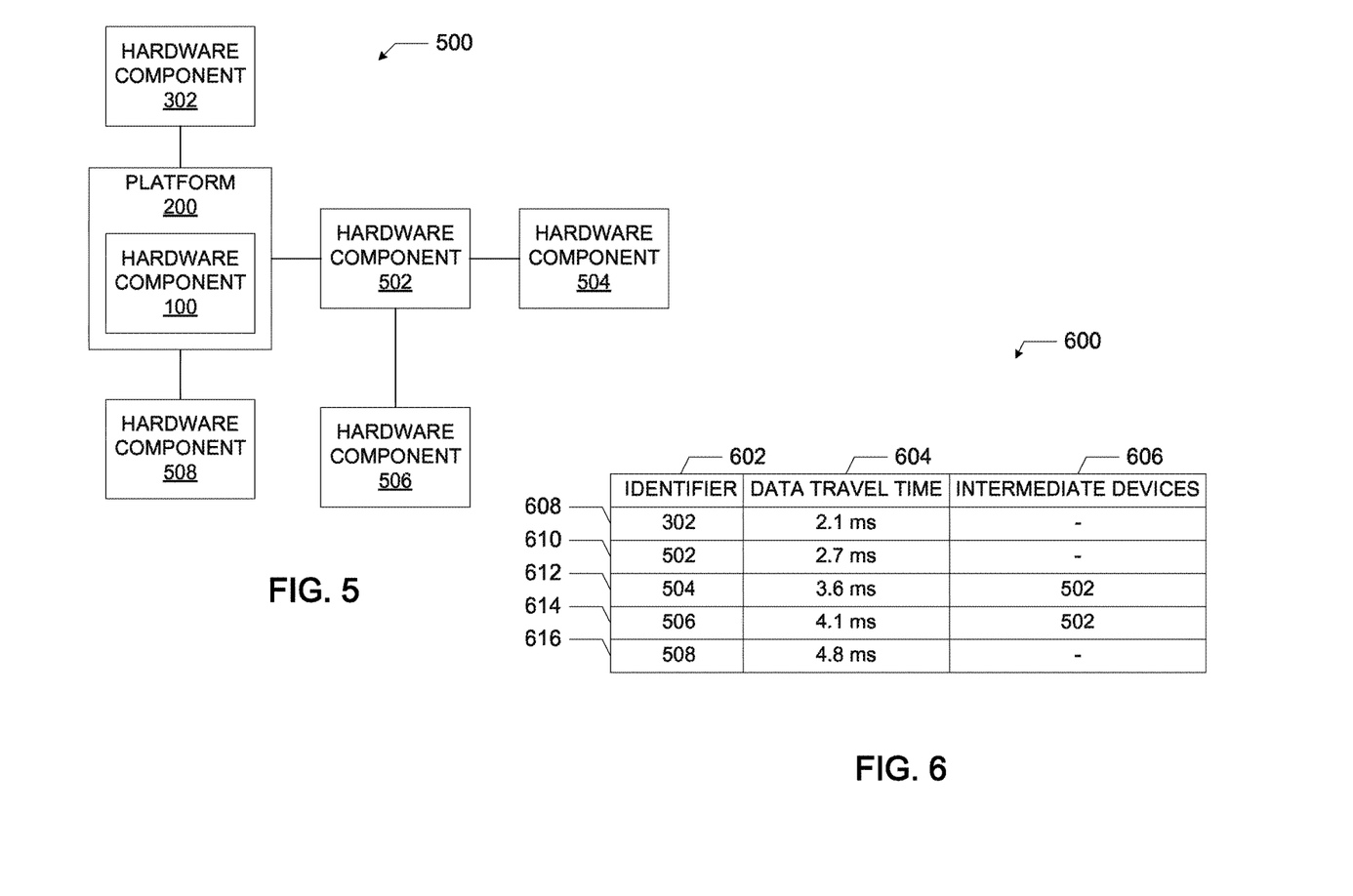
FIG. 5 illustrates another networked arrangement of hardware components, in accordance with various embodiments.
FIG. 6 is a data structure that may be used to store data representative of the hardware components in the networked arrangement of FIG. 5, in accordance with various embodiments.

FIGS. 3 and 5 illustrate two different networked arrangements of hardware components (including the hardware component 100). These examples may be used to illustrate various ones of the embodiments disclosed herein. In particular, FIG. 3 illustrates a networked arrangement 300 of hardware components (including the hardware component 100) and FIG. 5 illustrates a different networked arrangement 500 of hardware components (including the hardware component 100). The networked arrangement 300 may represent the network environment of the hardware component 100 at the time of a first round of network discovery, and the networked arrangement 500 may represent the network environment of the hardware component 100 at the time of a second, later round of network discovery. The first set of network discovery data may represent at least some of the arrangement 300 (e.g., relative to the hardware component 100), and the second set of network discovery data may represent at least some of the arrangement 500 (e.g., relative to the hardware component 100). In some embodiments, the set of hardware components discovered during network discovery may include only hardware components physically located in a common data center with the hardware component 100 at the time of network discovery (e.g., a time at which network discovery data is received by the hardware component 100 from the platform 200). In the networked arrangements of FIGS. 3 and 5, the various hardware components illustrated may be included in platforms; these platforms are omitted for ease of illustration.

For example, FIGS. 4 and 6 represent data structures 400 and 600, respectively, that may be used to store data representative of the hardware components in a network environment of the hardware component 100. The data stored in the data structures 400 and 600 may be provided to the hardware component 100 via the platform interface 110, and the platform 200 may generate this data by performing network discovery in response to a request from the network discovery logic 102. In particular, FIG. 4 is a data structure that may be used to store data representative of the hardware components in the networked arrangement of FIG. 3, and FIG. 6 is a data structure that may be used to store data representative of the hardware components in the networked arrangement of FIG. 5, in accordance with various embodiments. The data storage logic 104 may process and store data from the first round of network discovery (when the hardware component 100 is in the networked arrangement 300 of FIG. 3) in the data structure 400 and may process and store data from the second round of network discovery (when the hardware component 100 is in the networked arrangement 500 of FIG. 5) in the data structure 600.

The data structure 400 may include an identifier field 402, a data travel time field 404, and an intermediate devices field 406. The data structure 400 includes example entries 408, 410, 412, 414, and 416, corresponding to the hardware components 302, 304, 306, 308, and 310, respectively, of the networked arrangement 300 of FIG. 3. Identifiers of the hardware components of the networked arrangement 300 of FIG. 3 may be stored in the identifier field 402 (e.g., as MAC addresses or IP addresses). A data travel time associated with each of the hardware components of the networked arrangement 300 may be stored in the data travel time field 404. As discussed above, data travel time may be one-way or round-trip, and any suitable units may be used (e.g., hops or milliseconds). The intermediate devices field 406 may store identifiers for all of the hardware components located on the pathway in the networked arrangement 300 between the hardware component 100 and the hardware component associated with the identifier field 402 of the entry. For example, in the entry 408 associated with the hardware component 302, the intermediate devices field 406 may store an identifier of the hardware component 304 because the hardware component 304 is on the path between the hardware component 302 and a hardware component 100 in the networked arrangement 300. In another example, in the entry 410 associated with the hardware component 304, the intermediate devices field 406 may be empty because there are no hardware components on the path between the hardware component 304 and the hardware component 100 in the networked arrangement 300.

The data structure 600 may include an identifier field 602, a data travel time field 604, and an intermediate devices field 606. The data structure 600 includes example entries 608, 610, 612, 614, and 616, corresponding to the hardware components 302, 502, 504, 506, and 508, respectively, of the networked arrangement 500 of FIG. 5. Identifiers of the hardware components of the networked arrangement 500 of FIG. 5 may be stored in the identifier field 602 (e.g., as MAC addresses or IP addresses). A data travel time associated with each of the hardware components of the networked arrangement 500 may be stored in the data travel time field 604. As discussed above, data travel time may be one-way or round-trip, and any suitable units may be used (e.g., hops or milliseconds). The intermediate devices field 606 may store identifiers for all of the hardware components located on the pathway in the networked arrangement 500 between the hardware component 100 and the hardware component associated with the identifier field 602 of the entry. For example, in the entry 612 associated with the hardware component 504, the intermediate devices field 606 may store an identifier of the hardware component 502 because the hardware component 502 is on the path between the hardware component 504 and a hardware component 100 in the networked arrangement 300. In another example, in the entry 608 associated with the hardware component 302, the intermediate devices field 606 may be empty because there are no hardware components on the path between the hardware component 302 and the hardware component 100 in the networked arrangement 300.

Returning to FIG. 1, the network change logic 106 may be coupled to the memory 112 and may be configured to determine whether differences between first and second sets of network discovery data exceed a network change threshold. In particular, the network change logic 106 may be configured to detect changes in the network environment of the hardware component 100 over time and evaluate these changes against a network change threshold. The term "network change threshold," as used herein, refers to one or more criteria around one or more types of data included in the network discovery data, and represents a threshold at which the hardware component 100 is deemed to have "changed" network environments between the time at which a first set of network discovery data was received and a time at which the second set of network discovery data was received.

In some embodiments, the network change logic 106 may utilize a network change threshold that includes a particular number of hardware components in the first set of hardware components (identified via network discovery to be networked with the hardware component 100 and represented in the first set of discovery data) that are not present in the second set of hardware components (identified via network discovery to be networked with the hardware component 100 and represented in the second set of discovery data). The network change logic 106 may compare the first set of hardware component identifiers to the second set of hardware components, and count the number of hardware components in the first set that are not present in the second set. This counted number may then be compared to a number included in the network change threshold; if the counted number exceeds the threshold number, the network change logic 106 may determine that the differences between the first set of network discovery data and the second set of network discovery data exceed the network change threshold.

For example, the network change logic 106 may access the data structure 400 to determine that the hardware components 302, 304, 306, 308, and 310 were discovered to be networked with the hardware component 100 during a first round of network discovery (e.g., when the hardware component 100 was in the networked arrangement 300 of FIG. 3). The network change logic 106 may also access the data structure 600 and determine that the hardware components 302, 502, 504, 506, and 508 were discovered to be networked with a hardware component 100 during a second round of network discovery (e.g., when the hardware component 100 was in the networked arrangement 500 of FIG. 5). The network change logic 106 may compare the data in the data structures 400 and 600 to determine that only one hardware component in the data structure 400 (i.e., the hardware component 302) is also present in the data structure 600, and/or that 4 hardware components in the data structure 400 (i.e., the hardware components 304, 306, 308, and 310) are not present in the data structure 600. If the network change threshold specifies that at most 3 hardware devices in the environment of the hardware component 100 may not be present at a subsequent round of network discovery, the network change logic 106 may determine that the differences between the networked arrangement 300 and the networked arrangement 500 exceed this network change threshold.

In some embodiments, the network change logic 106 may utilize a network change threshold that includes a percentage of a number of hardware components in the first set of hardware components (identified via network discovery to be networked with the hardware component 100 and represented in the first set of discovery data) that are not present in the second set of hardware components (identified via network discovery to be network with the hardware component 100 and represented in the second set of discovery data). The network change logic 106 may compare the first set of hardware components identifiers to the second set of hardware components, count the number of hardware components in the first set that are not present in the second set, and compute the percentage by calculating the quotient of the counted number and the total number of hardware components in the first set of hardware components. This computed percentage may then be compared to a number percentage in the network change threshold; if the computed percentage exceeds the threshold percentage, the network change logic 106 may determine that the differences between the first set of network discovery data and the second set of network discovery data exceed the network change threshold.

For example, as discussed above, the network change logic 106 may access the data structures 400 and 600 to determine that only one hardware component in the data structure 400 (i.e., the hardware component 302) is also present in the data structure 600 (representing 1/5 or 20 percent of the total number of hardware components in the data structure 400), and/or that 4 hardware components in the data structure 400 (i.e., the hardware components 304, 306, 308, and 310) are not present in the data structure 600 (representing 4/5 or 80 percent of the total number of hardware components in the data structure 400). If the network change threshold specifies that at most 60 percent of the hardware devices in the environment of the hardware component 100 may not be present at a subsequent round of network discovery, the network change logic 106 may determine that the differences between the networked arrangement 300 and the networked arrangement 500 exceed this network change threshold.

In some embodiments, the network change logic 106 may utilize a network change threshold that includes a threshold on changes in the data travel time between the platform 200 and various other hardware components. This change may be represented by an absolute number (e.g., an absolute amount of time or number of hops, analogous to the number of devices discussed above) or a percentage (e.g., a percentage of time or number of hops, analogous to the percentage of devices discussed above). In embodiments in which a particular hardware component is networked with the hardware component 100 when first and second rounds of network discovery are performed, the network change logic 106 may compare the data travel time between the platform 200 and the particular hardware component in the first round of network discovery against the data travel time between the platform 200 of the particular hardware component in the second round of network discovery. If these two times differ from each other by more than a predetermined percentage or absolute amount of time, the network change logic 106 may determine that the differences between the first set of network discovery data and the second set of network discovery data exceed the network change threshold. Such an embodiment may be useful in detecting when a large number of hardware components have been stolen from a data center and rearranged in a new environment.

For example, the network change logic 106 may access the data structure 400 to determine that the hardware components 302, 304, 306, 308, and 310 were discovered to be networked with the hardware component 100 during a first round of network discovery (e.g., when the hardware component 100 was in the networked arrangement 300 of FIG. 3). The network change logic 106 may also access the data structure 600 and determine that the hardware components 302, 502, 504, 506, and 508 were discovered to be networked with a hardware component 100 during a second round of network discovery (e.g., when the hardware component 100 was in the networked arrangement 500 of FIG. 5). The network change logic 106 may compare the data in the data structures 400 and 600 to determine that only one hardware component in the data structure 400 (i.e., the hardware component 302) is also present in the data structure 600, and that the data travel time in the data structure 400 for the hardware component 302 (4.5 milliseconds) is greater than the data travel time in the data structure 600 for the hardware component 302 (2.1 milliseconds). If the network change threshold specifies a change in travel time of at most 50 percent, for example, or at most 1.5 milliseconds, for example, the network change logic 106 may determine that the differences between the networked arrangement 300 and the networked arrangement 500 exceed this network change threshold. Such a threshold may be applied separately to the data travel times of different hardware components present in the first and second sets of network discovery data, to particular hardware components present in the first and second sets of network discovery data, to particular types of components present in the first and second sets of network discovery data (e.g., the data travel time to a host in each environment, even when the host is a different device in the different environments), or to an aggregation of data travel times of different hardware components (e.g., an average).

The above examples of network discovery data and the use of network discovery data in evaluating a network change threshold are simply illustrative, and any other suitable network discovery data and network change threshold may be used. For example, the network change threshold may depend on detecting a certain percentage of familiar hosts, certain specific hosts or other hardware components present in the network environment, particular familiar network traffic patterns or identifiers, or any combination thereof.

In some embodiments, the network change logic 106 may combine any of the above criteria with AND, OR, or weighting operations as part of the determination of whether the differences between the first and second sets of network discovery data exceed the network change threshold. For example, in some embodiments, the network change logic 106 may determine that the network change threshold is exceeded if the number of hardware components present in the first and second sets of network discovery data differ by more than a predetermined number or percentage, or the data travel times in the first and second sets of network discovery data differ by more than a predetermined number or percentage.

Returning to FIG. 1, the operation control logic 108 may be coupled to the network change logic 106 and may be configured to, in response to a determination by the network change logic 106 that the differences between the first and second sets of network discovery data exceed the network change threshold, cause disablement of operation of one or more functions of the hardware component 100. As used herein, a "function" of a hardware component may refer to a feature or operation typically performed by that hardware component as part of its normal operating role. For example, disablement of one or more functions of a storage device may include disablement of the ability to read from the storage device and disablement of the ability to write to the storage device. In another example, disablement of one or more functions of a server may include disablement of the ability of the server to provide data in response to a request. The operation control logic 108 may cause disablement of one or more functions of the hardware component 100 by directly preventing the performance of the one or more functions or instructing another set of logic of the hardware component 100 to prevent the performance of the one or more functions. In some embodiments, disablement of one or more functions of the hardware component 100 may include "locking" or "bricking" the hardware component 100.

In some embodiments, the one or more functions of the hardware component 100 may remain disabled until an enabling event occurs. In some embodiments, such enabling event may include the receipt, by the operation control logic 108, of an initialization command from an administrator device via a secure channel (as discussed above with reference to the network discovery logic 102). In response to the receipt of such an initialization command, the operation control logic 108 may cause allowance of operation of the one or more functions of the hardware component 100. This may restore the hardware component 100 to normal functionality.

Figure 7:
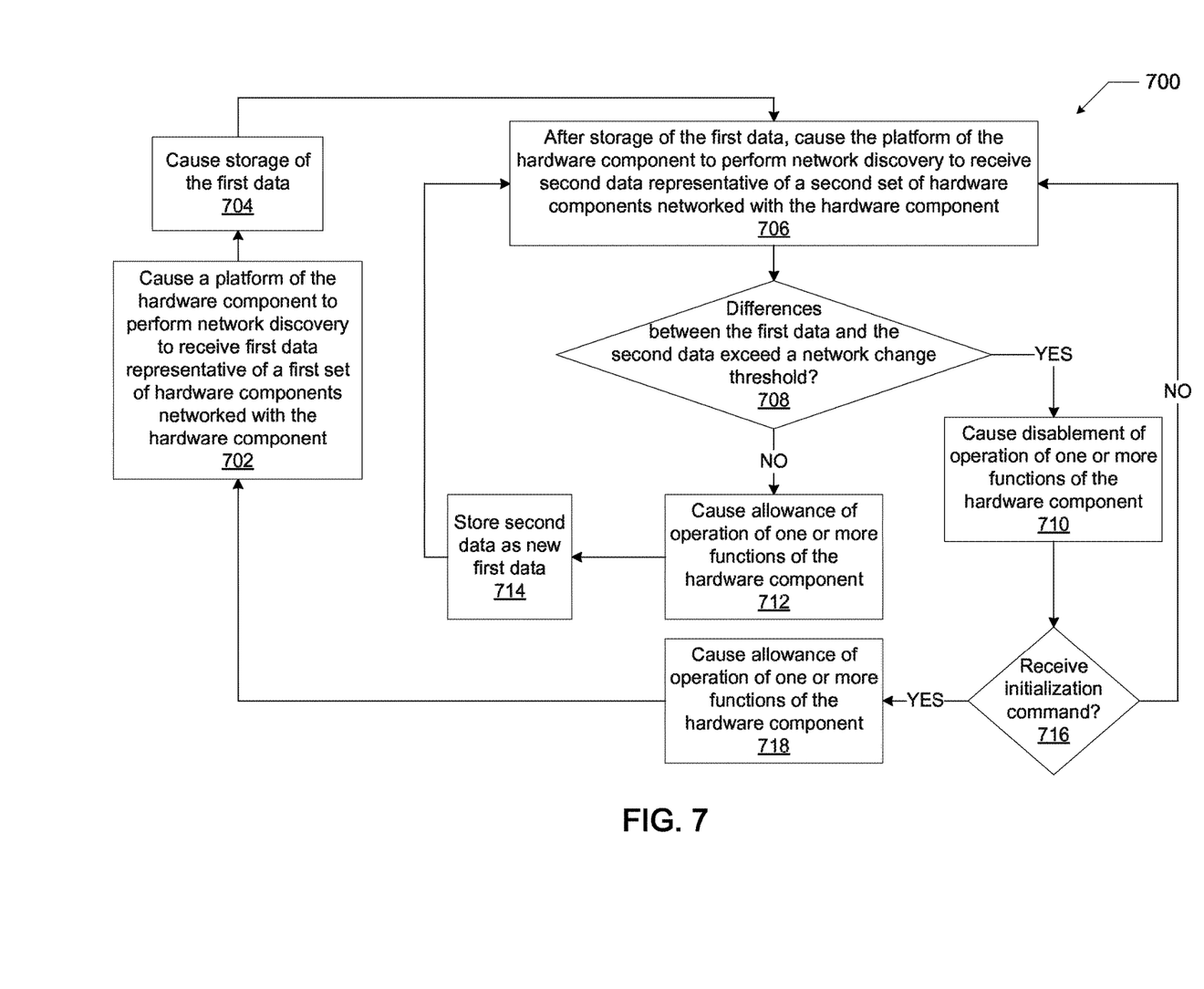
FIG. 7 is a flow diagram of a method for selectively disabling operation of a hardware component, in accordance with various embodiments.

FIG. 7 is a flow diagram of a method 700 for selectively disabling operation of a hardware component, in accordance with various embodiments. For illustrative purposes, operations of the method 700 may be described as performed by the hardware component 100 of the platform 200, but the operations of the method 700, including individual operations of the method 700, may be performed by any suitably configured component or combination of components of a computing system.

At 702, the hardware component 100 (e.g., the network discovery logic 102) may cause the platform 200 to perform network discovery to receive first data representative of a first set of hardware components networked with the hardware component 100.

At 704, the hardware component 100 (e.g., the data storage logic 104) may cause storage of the first data (received at 702). The first data may be stored in the memory 112, for example.

At 706, the hardware component 100 (e.g., the network discovery logic 102) may, after storage of the first data at 704, cause the platform 200 of the hardware component 100 to perform network discovery to receive data representative of a second set of hardware components networked with a hardware component 100. As discussed above, the platform 200 of 706 may be a different device than the platform 200 of 702 (e.g., if the hardware component 100 has been moved between platforms in the interim).

At 708, the hardware component 100 (e.g., the network change logic 106) may determine whether the differences between the first data (of 702) and the second data (of 706) exceed a network change threshold. The network change threshold of 708 may take the form of any of the embodiments discussed above with reference to the network change logic 106.

If the hardware component 100 determines at 708 that the differences between the first data and the second data do not exceed the network change threshold, the hardware component 100 may proceed to 712 at which the hardware component 100 (e.g., the operation control logic 108) may cause allowance of operation of one or more functions of the hardware component 100. In some embodiments, causing allowance of operation of one or more functions of the hardware component 100 may be performed by not causing disablement of operation of one or more functions of the hardware component. In other embodiments, causing allowance of operation of one or more functions of the hardware component 100 may be performed by affirmatively enabling operation of the one or more functions of the hardware component 100. The hardware component 100 may then proceed to 714 at which the hardware component 100 (e.g., the data storage logic 104) may store the second data as the new first data. The hardware component 100 may then proceed to 706 to cause the platform 200 of the hardware component 100 to perform network discovery to receive new second data.

If the hardware component 100 determines at 708 that the differences between the first data and the second data do exceed the network change threshold, the hardware component 100 may proceed to 710 at which the hardware component 100 (e.g., the operation control logic 108) may cause disablement of operation of one or more functions of the hardware component. In some embodiments, causing disablement of operation of one or more functions of the hardware component 100 may be performed by not causing enablement of operation of one or more functions of the hardware component. In other embodiments, causing disablement of operation of one or more functions of the hardware component 100 may be performed by affirmatively disabling operation of the one or more functions of the hardware component 100.

From 710, the hardware component 100 may proceed to 716, at which the hardware component 100 (e.g., the operation control logic 108) may determine whether or not an initialization command has been received (e.g., from a remote administrator device). If the hardware component 100 determines at 716 that no initialization command has been received, disablement of the one or more functions of the hardware component 100 may be continued and the hardware component 100 may return to 706 to gather new second data to compare against the existing first data.

If the hardware component 100 determines at 716 that an initialization command has been received, the hardware component 100 may proceed to 718 at which the hardware component 100 (e.g., the operation control logic 108) may cause allowance of operation of one or more functions of the hardware component (e.g., as discussed above with reference to 712). The hardware component 100 may then proceed to 702 at which the hardware component 100 (e.g., the network discovery logic 102) may cause the platform 200 of the hardware component 100 to perform network discovery to receive new first data.

Figure 8:
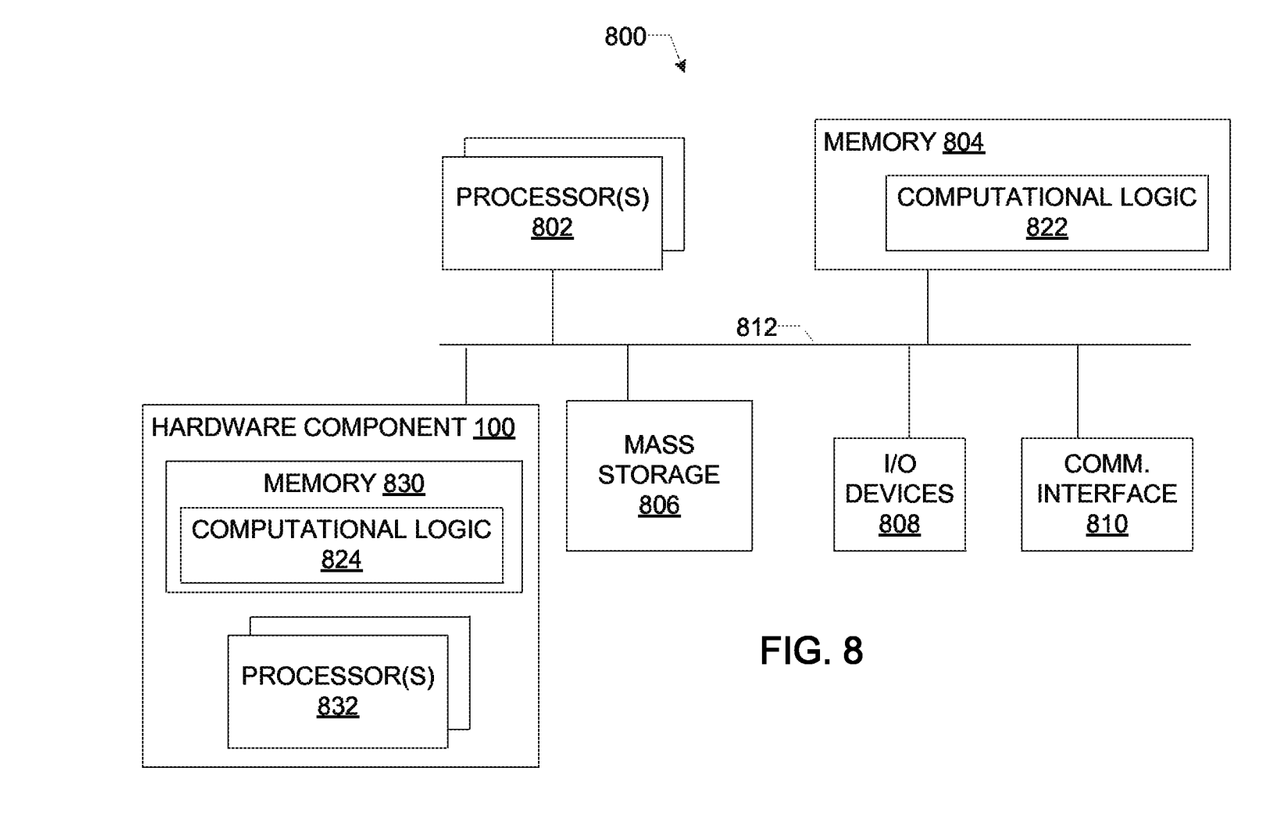
FIG. 8 is a block diagram of an example computing platform that may be suitable for practicing various ones of the disclosed embodiments.

FIG. 8 is a block diagram of an example computing platform 800 that may be a suitable setting for practicing the disclosed embodiments (e.g., the embodiments discussed above with reference to the hardware component 100 and the platform 200). In some embodiments, the computing platform 800 may be configured to serve as the platform 200. Although the computing platform 800 is illustrated as including a particular hardware component 100, the computing platform 800 may include multiple hardware components configured as described herein with reference to the hardware component 100. The computing platform 800 may include, or be part of, any of a number of computing systems, such as a server computing system. The computing platform 800 may be included in a data center.

As shown, the computing platform 800 includes a number of processing devices 802, and a system memory 804. The processing devices 802 may include one or more processing cores or other processing devices. Additionally, the computing platform 800 may include one or more mass storage devices 806 (such as solid-state drive, diskette, hard drive, compact disc read only memory (CD-ROM) and so forth), input/output (I/O) devices 808 (such as display, keyboard, cursor control, camera, microphone, Global Positioning System (GPS) receiver, motion detectors, and so forth) and communication interfaces 810 (such as network interface cards, modems, WiFi devices, Bluetooth devices, and so forth). The communication interface 810 may include the network interface 204 of FIG. 2. Any suitable ones of these types of devices may be configured as the hardware component 100. The elements may be coupled to each other via a system bus 812, which represents one or more buses. In the case of multiple buses, they may be bridged by one or more bus bridges (not shown). The techniques and systems described herein may be used to selectively disable any suitable component of the computing platform 800 or combination of multiple computing platforms 800.

Each of these elements may perform its conventional functions known in the art. In particular, a memory 804 may be employed to store a working copy and a permanent copy of programming instructions implementing any suitable platform methods disclosed herein when executed by the respective processing devices 802, herein collectively denoted as computational logic 822. In some such embodiments, the memory 804 may be employed to store, as computer-readable media, a working copy and a permanent copy of programming instructions implementing any suitable ones of the platform methods disclosed herein (e.g., the methods perform by the management logic 202 of FIG. 2), or portions thereof. The various methods may be implemented by assembler instructions supported by processing devices 802 or high-level languages, such as, for example, C, that can be compiled into such instructions.

The permanent copy of the programming instructions may be placed into the memory 804 in the factory, or in the field, through, for example, a computer-readable distribution medium (not shown), such as a compact disc (CD), or through communication interface 810 (e.g., from a distribution server (not shown)). The constitution of elements 802-812 are known, and accordingly will not be further described.

The hardware component 100 may include a memory 830 employed to store a working copy and a permanent copy of programming instructions implementing any suitable hardware component methods disclosed herein when executed by the processing devices 832, herein collectively denoted as computational logic 824. In some such embodiments, the memory 830 may be employed to store, as computer-readable media, a working copy and a permanent copy of programming instructions implementing the method of FIG. 7, or portions thereof. The various methods may be implemented by assembler instructions supported by processing devices 832 or high-level languages, such as, for example, C, that can be compiled into such instructions.

The permanent copy of the programming instructions for the hardware component 100 may be placed into the memory 830 in the factory, or in the field, through, for example, a computer-readable distribution medium (not shown), such as a compact disc (CD), or through communication interface 810 (e.g., from a distribution server (not shown)).

Computer-readable media (including transitory and non-transitory computer-readable media), methods, systems and devices for performing the above-described techniques are illustrative examples of embodiments disclosed herein. An example transitory computer-readable medium may be a signal. Additionally, other devices in the above-described interactions may be configured to perform various disclosed techniques.

The following paragraphs provide illustrative embodiments of the present disclosure.

Example 1 may be a hardware component, comprising: network discovery logic to: cause a platform of the hardware component to perform network discovery at a first time to receive first data representative of a first set of hardware components networked with the hardware component, and cause the platform of the hardware component to perform network discovery at a second time to receive second data representative of a second set of hardware components networked with the hardware component; data storage logic to cause storage of the first and second data; network change logic to determine whether differences between the first data and the second data exceed a network change threshold; and operation control logic to, in response to a determination by the network change logic that the differences between the first data and the second data exceed the network change threshold, cause disablement of operation of one or more functions of the hardware component.

Example 2 may be example 1, wherein the first data may include identifiers of the hardware components in the first set of hardware components, and wherein the identifiers may include Media Access Control (MAC) addresses, serial numbers, or Internet Protocol (IP) addresses.

Example 3 may be example 2, wherein the network change threshold may include a number of hardware components of the first set of hardware components that are not present in the second set of hardware components.

Example 4 may be example 1, wherein the first set of hardware components may include a particular hardware component, the second set of hardware components may include the particular hardware component, the first data may include a first data travel time between the platform and the particular hardware component, and the second data may include a second data travel time between the platform and the particular hardware component.

Example 5 may be example 4, wherein the network change threshold may include a percentage change between the first data travel time and the second data travel time.

Example 6 may be example 4, wherein the first data travel time and the second data travel time are measured as numbers of hops.

Example 7 may be example 1, wherein the operation control logic may further: after causing disablement of operation of one or more functions of the hardware component, receive an initialization command from an administrator device via a secure channel; and in response to receipt of the initialization command, cause allowance of operation of the one or more functions of the hardware component.

Example 8 may be example 1, wherein the network discovery logic may: receive a signal that the hardware component has undergone a power-on event; and wherein causation of the platform of the hardware component to perform network discovery to receive the second data occurs in response to the receipt of the signal.

Example 9 may be example 1, wherein the hardware component may be a server of a data center.

Example 10 may be example 1, wherein the hardware component may be a storage device of a data center.

Example 11 may be example 1, wherein the network discovery logic, the data storage logic, the network change logic, and the operation control logic are all disposed within a common device housing.

Example 12 may be a method for selectively disabling operation of a hardware component, comprising: causing, by the hardware component, a platform of the hardware component to perform network discovery to receive first data representative of a first set of hardware components networked with the hardware component; causing, by the hardware component, storage of the first data; after storage of the first data, causing, by the hardware component, the platform of the hardware component to perform network discovery to receive second data representative of a second set of hardware components networked with the hardware component; determining, by the hardware component, that differences between the first data and the second data exceed a network change threshold; and in response to determining that the differences between the first data and the second data exceed the network change threshold, causing, by the hardware component, disablement of operation of one or more functions of the hardware component.

Example 13 may be example 12, wherein the first data may include identifiers of the hardware components in the first set of hardware components.

Example 14 may be example 13, wherein the network change threshold may include a percentage of a number of hardware components of the first set of hardware components that are not present in the second set of hardware components.

Example 15 may be example 14, wherein the first set of hardware components may include a particular hardware component, the second set of hardware components may include the particular hardware component, the first data may include a first data travel time between the platform and the particular hardware component, and the second data may include a second data travel time between the platform and the particular hardware component.

Example 16 may be example 15, wherein the network change threshold may include a percentage change between the first data travel time and the second data travel time.

Example 17 may be example 15, wherein the first data travel time and the second data travel time are measured as numbers of hops.

Example 18 may be example 12, further comprising: receiving, by the hardware component, an initialization command from an administrator hardware component via a secure channel; wherein causation of the platform of the hardware component to perform network discovery to receive the first data occurs in response to the receipt of the initialization command.

Example 19 may be example 12, further comprising: after causing disablement of operation of one or more functions of the hardware component, receiving, by the hardware component, an initialization command from an administrator hardware component via a secure channel; and in response to receipt of the initialization command, causing, by the hardware component, allowance of operation of the one or more functions of the hardware component.

Example 20 may be example 12, further comprising: before causing the platform of the hardware component to perform network discovery to receive the first data: causing the platform of the hardware component to perform network discovery to receive third data representative of a third set of hardware components networked with the hardware component, and causing, by the hardware component, storage of the third data; before causing the platform of the hardware component to perform network discovery to receive the second data: determining, by the hardware component, that differences between the third data and the first data do not exceed the network change threshold, and in response to determining that the differences between the third data and the first data do not exceed the network change threshold, cause allowance of operation of the one or more functions of the hardware component.

Example 21 may be example 12, further comprising: receiving, by the hardware component, a signal that the hardware component has undergone a power-on event; and wherein causing the platform of the hardware component to perform network discovery to receive the second data occurs in response to the receipt of the signal.

Example 22 may be example 12, wherein performance of network discovery may include use of Simple Network Management Protocol (SNMP).

Example 23 may be example 22, wherein the first set of hardware components only may include hardware components physically located in a common data center with the hardware component at a time at which the first data is received.

Example 24 may be example 12, wherein the first data may include identifiers of the hardware components in the first set of hardware components, and wherein the identifiers may include Media Access Control (MAC) addresses, serial numbers, or Internet Protocol (IP) addresses.

Example 25 may be example 24, wherein the network change threshold may include a number of hardware components of the first set of hardware components that are not present in the second set of hardware components.

Example 26 may be example 12, wherein the hardware component may be a server of a data center.

Example 27 may be example 12, wherein the hardware component may be a storage device of a data center.

Example 28 may be one or more non-transitory computer-readable media having instructions thereon that, in response to execution by one or more processing devices of a hardware component, cause the hardware component to: cause a platform of the hardware component to perform network discovery to receive first data representative of a first set of hardware components networked with the hardware component; cause storage of the first data; after storage of the first data, cause the platform of the hardware component to perform network discovery to receive second data representative of a second set of hardware components networked with the hardware component; determine that the differences between the first data and the second data exceed a network change threshold; and in response to a determination that the differences between the first data and the second data exceed the network change threshold, cause disablement of operation of one or more functions of the hardware component.

Example 29 may be example 28, wherein the first data may include identifiers of the hardware components in the first set of hardware components.

Example 30 may be example 29, wherein the network change threshold may include a percentage of a number of hardware components of the first set of hardware components that are not present in the second set of hardware components.

Example 31 may be example 28, wherein the first set of hardware components may include a particular hardware component, the second set of hardware components may include the particular hardware component, the first data may include a first data travel time between the platform and the particular hardware component, and the second data may include a second data travel time between the platform and the particular hardware component.

Example 32 may be example 31, wherein the network change threshold may include a percentage change between the first data travel time and the second data travel time.

Example 33 may be example 28, wherein the instructions may further to cause the hardware component to: receive an initialization command from an administrator device via a secure channel; wherein causation of the platform of the hardware component to perform network discovery to receive the first data occurs in response to the receipt of the initialization command.

Example 34 may be example 28, wherein the instructions may further to cause the hardware component to: after causing disablement of operation of one or more functions of the hardware component, receive an initialization command from an administrator device via a secure channel; and in response to receipt of the initialization command, cause allowance of operation of the one or more functions of the hardware component.

Example 35 may be example 28, wherein the instructions may further cause the hardware component to: before causation of the platform of the hardware component to perform network discovery to receive the first data: cause the platform of the hardware component to perform network discovery to receive third data representative of a third set of hardware components networked with the hardware component, and cause storage of the third data; before causation of the platform of the hardware component to perform network discovery to receive the second data: determine that the differences between the third data and the first data do not exceed the network change threshold, and in response to a determination that the differences between the third data and the first data do not exceed the network change threshold, cause allowance of operation of the one or more functions of the hardware component.

Example 36 may be example 28, wherein the instructions may further to cause the hardware component to: receive a signal that the hardware component has undergone a power-on event; and wherein causation of the platform of the hardware component to perform network discovery to receive the second data occurs in response to the receipt of the signal.

Example 37 may be example 28, wherein performance of network discovery may include use of Simple Network Management Protocol (SNMP).

Example 38 may be example 28, wherein the first set of hardware components only may include hardware components physically located in a common data center with the hardware component at a time at which the first data is received.

Example 39 may be a hardware component, comprising: means for causing a platform of the hardware component to perform network discovery to receive first data representative of a first set of hardware components networked with the hardware component; means for causing storage of the first data; means for causing, after storage of the first data, the platform of the hardware component to perform network discovery to receive second data representative of a second set of hardware components networked with the hardware component; means for determining that the differences between the first data and the second data exceed a network change threshold; and means for causing, in response to a determination that the differences between the first data and the second data exceed the network change threshold, disablement of operation of one or more functions of the hardware component.

Example 40 may be example 39, wherein the first data may include identifiers of the hardware components in the first set of hardware components.

Example 41 may be example 40, wherein the network change threshold may include a percentage of a number of hardware components of the first set of hardware components that are not present in the second set of hardware components.

Example 42 may be example 41, wherein the first set of hardware components may include a particular hardware component, the second set of hardware components may include the particular hardware component, the first data may include a first data travel time between the platform and the particular hardware component, and the second data may include a second data travel time between the platform and the particular hardware component.

Example 43 may be example 42, wherein the network change threshold may include a percentage change between the first data travel time and the second data travel time.

Example 44 may be example 42, wherein the first data travel time and the second data travel time are measured as numbers of hops.

Example 45 may be example 39, further comprising: means for receiving an initialization command from an administrator device via a secure channel; wherein causation of the platform of the hardware component to perform network discovery to receive the first data occurs in response to the receipt of the initialization command.

Example 46 may be example 39, further comprising: means for receiving, after disablement of operation of one or more functions of the hardware component, an initialization command from an administrator device via a secure channel; and means for causing, in response to receipt of the initialization command, allowance of operation of the one or more functions of the hardware component.

Example 47 may be example 39, further comprising: means for, before causing the platform of the hardware component to perform network discovery to receive the first data: causing the platform of the hardware component to perform network discovery to receive third data representative of a third set of hardware components networked with the hardware component, and causing storage of the third data; means for, before causing the platform of the hardware component to perform network discovery to receive the second data: determining that the differences between the third data and the first data do not exceed the network change threshold, and in response to determining that the differences between the third data and the first data do not exceed the network change threshold, causing allowance of operation of the one or more functions of the hardware component.

Example 48 may be example 39, further comprising: means for receiving a signal that the hardware component has undergone a power-on event; and wherein causing the platform of the hardware component to perform network discovery to receive the second data occurs in response to the receipt of the signal.

Example 49 may be example 39, wherein performance of network discovery may include use of Simple Network Management Protocol (SNMP).

Example 50 may be example 49, wherein the first set of hardware components only may include hardware components physically located in a common data center with the hardware component at a time at which the first data is received.

Example 51 may be example 39, wherein the first data may include identifiers of the hardware components in the first set of hardware components, and wherein the identifiers may include Media Access Control (MAC) addresses, serial numbers, or Internet Protocol (IP) addresses.

Example 52 may be example of claim 51, wherein the network change threshold may include a number of hardware components of the first set of hardware components that are not present in the second set of hardware components.

Example 53 may be example 39, wherein the hardware component is a server of a data center.

Example 54 may be example 39, wherein the hardware component is a storage device of a data center.

What is claimed is:
1. A hardware component, comprising:
   network discovery logic to:
      cause a platform of the hardware component to perform network discovery at a first time to receive first data representative of a first set of hardware components of a network networked with the hardware compo- nent, the first data including at least one travel time between the platform and a hardware component of the first set, and cause the platform of the hardware component to perform network discovery at a second time to receive second data representative of a second set of hardware components of the network networked with the hardware component, the second data including at least one travel time between the platform and a hardware component of the second set;

data storage logic to cause storage of the first and second data;

network change logic to determine whether differences between the first data and the second data indicate a change in a network topology of the network in excess of a pre-defined threshold indicating that the hardware component has been rearranged in a different environment, wherein the pre-defined threshold is either:

a fraction or percentage of hardware components present in the first set of hardware components but not present in the second set of hardware components, or a fraction or percentage of hardware components present in the second set of hardware components but not present in the first set of hardware components; and operation control logic to, in response to a determination by the network change logic that the differences between the first data and the second data exceed the pre-defined threshold of the network topology, cause disablement of operation of one or more functions of the hardware component.

2. The hardware component of claim 1, wherein the first data includes identifiers of the hardware components in the first set of hardware components, and wherein the identifiers include Media Access Control (MAC) addresses, serial numbers, or Internet Protocol (IP) addresses.

3. The hardware component of claim 1, wherein the first set of hardware components includes a particular hardware component, the second set of hardware components includes the particular hardware component, the first data includes a first data travel time between the platform and the particular hardware component, and the second data includes a second data travel time between the platform and the particular hardware component.

4. The hardware component of claim 3, wherein the pre-defined threshold includes a percentage change between the first data travel time and the second data travel time.

5. The hardware component of claim 3, wherein the first data travel time and the second data travel time are measured as numbers of hops.

6. The hardware component of claim 1, wherein the operation control logic is further to:

after causing disablement of operation of one or more functions of the hardware component, receive an initialization command from an administrator device via a secure channel; and in response to receipt of the initialization command, cause allowance of operation of the one or more functions of the hardware component.

7. The hardware component of claim 1, wherein the network discovery logic is to:

receive a signal that the hardware component has undergone a power-on event; and wherein causation of the platform of the hardware component to perform network discovery to receive the second data occurs in response to the receipt of the signal.

8. The hardware component of claim 1, wherein the hardware component is a server or a storage device of a data center; and wherein the network discovery logic, the data storage logic, the network change logic, and the operation control logic are all disposed within a common device housing.

9. The hardware component of claim 1, wherein the pre-defined threshold further includes at least one of:

a number of hardware components that are present in the first set of hardware components that are not present in the second set of hardware components, or a number of hardware components that are present in the second set of hardware components that are not present in the first set of hardware components.

10. A method for selectively disabling operation of a hardware component, comprising:

causing, by the hardware component, a platform of the hardware component to perform network discovery to receive first data representative of a first set of hardware components of a network networked with the hardware component, the first data including at least one travel time between the platform and a hardware component of the first set;

causing, by the hardware component, storage of the first data;

after storage of the first data, causing, by the hardware component, the platform of the hardware component to perform network discovery to receive second data representative of a second set of hardware components of the network networked with the hardware component, the second data including at least one travel time between the platform and a hardware component of the second set;

determining, by the hardware component, that differences between the first data and the second data indicate a change in a network topology of the network in excess of a pre-defined threshold and indicate that the hardware component has been rearranged in a different environment, wherein the pre-defined threshold is either:

a fraction or percentage of hardware components present in the first set of hardware components but not present in the second set of hardware components, or a fraction or percentage of hardware components present in the second set of hardware components but were not present in the first set of hardware components; and in response to determining that the differences between the first data and the second data exceed the pre-defined threshold of the network topology, causing, by the hardware component, disablement of operation of one or more functions of the hardware component.

11. The method of claim 10, wherein the first data includes identifiers of the hardware components in the first set of hardware components, and wherein the first set of hardware components includes a particular hardware component, the second set of hardware components includes the particular hardware component, the first data includes a first data travel time between the platform and the particular hardware component, and the second data includes a second data travel time between the platform and the particular hardware component.

12. The method of claim 11, wherein the pre-defined threshold includes a percentage change between the first data travel time and the second data travel time; or the first data travel time and the second data travel time are measured as numbers of hops.

13. The method of claim 10, further comprising:
receiving, by the hardware component, an initialization command from an administrator hardware component via a secure channel;
wherein causation of the platform of the hardware component to perform network discovery to receive the first data occurs in response to the receipt of the initialization command.

14. The method of claim 10, further comprising:
after causing disablement of operation of one or more functions of the hardware component, receiving, by the hardware component, an initialization command from an administrator hardware component via a secure channel; and
in response to receipt of the initialization command, causing, by the hardware component, allowance of operation of the one or more functions of the hardware component.

15. The method of claim 10, further comprising:
before causing the platform of the hardware component to perform network discovery to receive the first data:
causing the platform of the hardware component to perform network discovery to receive third data representative of a third set of hardware components networked with the hardware component, and
causing, by the hardware component, storage of the third data;
before causing the platform of the hardware component to perform network discovery to receive the second data:
determining, by the hardware component, that differences between the third data and the first data do not exceed the pre-defined threshold, and
in response to determining that the differences between the third data and the first data do not exceed the network change threshold, cause allowance of operation of the one or more functions of the hardware component.

16. The method of claim 10, further comprising:
receiving, by the hardware component, a signal that the hardware component has undergone a power-on event; and
wherein causing the platform of the hardware component to perform network discovery to receive the second data occurs in response to the receipt of the signal.

17. One or more non-transitory computer-readable media having instructions thereon that, in response to execution by one or more processing devices of a hardware component, cause the hardware component to:
cause a platform of the hardware component to perform network discovery to receive first data representative of a first set of hardware components of a network networked with the hardware component, the first data including at least one travel time between the platform and a hardware component of the first set;
cause storage of the first data;
after storage of the first data, cause the platform of the hardware component to perform network discovery to receive second data representative of a second set of hardware components of the network networked with the hardware component, the second data including at least one travel time between the platform and a hardware component of the second set;
determine that differences between the first data and the second data indicate a change in a network topology of the network in excess of a pre-defined threshold and indicate that the hardware component has been rearranged in a different environment, wherein the pre-defined threshold is either:
a fraction or percentage of hardware components present in the first set of hardware components but not present in the second set of hardware components, or
a fraction or percentage of hardware components present in the second set of hardware components but not present in the first set of hardware components; and
in response to a determination that the differences between the first data and the second data exceed the pre-defined threshold of the network topology, cause disablement of operation of one or more functions of the hardware component.

18. The one or more non-transitory computer-readable media of claim 17, wherein the first data includes identifiers of the hardware components in the first set of hardware components.

19. The one or more non-transitory computer-readable media of claim 17, wherein the first set of hardware components includes a particular hardware component, the second set of hardware components includes the particular hardware component, the first data includes a first data travel time between the platform and the particular hardware component, and the second data includes a second data travel time between the platform and the particular hardware component; wherein the pre-defined change threshold includes a percentage change between the first data travel time and the second data travel time.

20. The one or more non-transitory computer-readable media of claim 17, wherein the instructions are further to cause the hardware component to:
receive an initialization command from an administrator device via a secure channel;
wherein causation of the platform of the hardware component to perform network discovery to receive the first data occurs in response to the receipt of the initialization command.

21. The one or more non-transitory computer-readable media of claim 17, wherein the instructions are further to cause the hardware component to:
after causing disablement of operation of one or more functions of the hardware component, receive an initialization command from an administrator device via a secure channel; and
in response to receipt of the initialization command, cause allowance of operation of the one or more functions of the hardware component.

22. The one or more non-transitory computer-readable media of claim 17, wherein the instructions are further to cause the hardware component to:
before causation of the platform of the hardware component to perform network discovery to receive the first data:
cause the platform of the hardware component to perform network discovery to receive third data representative of a third set of hardware components networked with the hardware component, and
cause storage of the third data;
before causation of the platform of the hardware component to perform network discovery to receive the second data:
determine that the differences between the third data and the first data do not exceed the pre-defined threshold, and in response to a determination that the differences between the third data and the first data do not exceed the network change threshold, cause allowance of operation of the one or more functions of the hardware component.

23. The one or more non-transitory computer-readable media of claim 17, wherein the instructions are further to cause the hardware component to:
receive a signal that the hardware component has undergone a power-on event; and
wherein causation of the platform of the hardware component to perform network discovery to receive the second data occurs in response to the receipt of the signal.

24. The one or more non-transitory computer-readable media of claim 17, wherein performance of network discovery includes use of Simple Network Management Protocol (SNMP).

25. The one or more non-transitory computer-readable media of claim 17, wherein the first set of hardware components only includes hardware components physically located in a common data center with the hardware component at a time at which the first data is received.

* * * * *